US012307904B2

(12) United States Patent
Kuroi

(10) Patent No.: US 12,307,904 B2
(45) Date of Patent: May 20, 2025

(54) SYSTEM, BOAT, AND ELECTRONIC DEVICE

(71) Applicant: NHK SPRING CO., LTD., Yokohama (JP)

(72) Inventor: Shigeru Kuroi, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 201 days.

(21) Appl. No.: 18/161,431

(22) Filed: Jan. 30, 2023

(65) Prior Publication Data

US 2023/0245570 A1 Aug. 3, 2023

(30) Foreign Application Priority Data

Feb. 1, 2022 (JP) .................................. 2022-014238

(51) Int. Cl.
*G08G 3/00* (2006.01)
*G06F 3/04845* (2022.01)

(52) U.S. Cl.
CPC ........... *G08G 3/00* (2013.01); *G06F 3/04845* (2013.01)

(58) Field of Classification Search
CPC .... G01C 21/3407; G06F 3/04845; G08G 3/00
USPC ......................................................... 701/428
See application file for complete search history.

(56) References Cited

U.S. PATENT DOCUMENTS

| 9,764,807 B2 * | 9/2017 | Frisbie ..................... B63B 49/00 |
| 9,766,077 B2 * | 9/2017 | Silfven .................... B63B 49/00 |
| 10,488,204 B2 * | 11/2019 | Rivers ....................... G08G 3/02 |
| 10,936,907 B2 * | 3/2021 | Suresh .................... G06V 10/82 |
| 10,937,252 B2 * | 3/2021 | Whitmyer, Jr. .......... G07C 1/24 |
| 2018/0107210 A1 * | 4/2018 | Harnett ................... B63G 8/001 |
| 2019/0114846 A1 * | 4/2019 | Whitmyer, Jr. .......... G07C 1/24 |
| 2019/0137993 A1 * | 5/2019 | Bertrand ................ B63H 25/02 |
| 2019/0172348 A1 * | 6/2019 | Rivers ..................... G08G 5/723 |
| 2019/0204085 A1 * | 7/2019 | Kikuchi ................. G01C 21/20 |
| 2019/0204086 A1 * | 7/2019 | Kikuchi ................ G01C 21/203 |
| 2019/0263484 A1 * | 8/2019 | Wilson .................... B63B 45/04 |
| 2020/0012283 A1 * | 1/2020 | Nguyen ................ G05D 1/0206 |
| 2020/0089234 A1 * | 3/2020 | Nishiyama ............... G06T 15/04 |
| 2020/0407030 A1 * | 12/2020 | Ueno ...................... B63B 79/10 |
| 2021/0019521 A1 * | 1/2021 | Park ........................ B63B 79/15 |
| 2021/0116249 A1 * | 4/2021 | Pecota .................... G09G 5/377 |

(Continued)

FOREIGN PATENT DOCUMENTS

| CA | 3220796 A1 * | 1/2023 | ............ B63B 34/60 |
| CN | 115016496 A * | 9/2022 | ........... G05D 1/0206 |

(Continued)

*Primary Examiner* — Atul Trivedi
(74) *Attorney, Agent, or Firm* — Holtz, Holtz & Volek PC

(57) ABSTRACT

The system accepts an operation to be carried out to virtually install installation objects on a water surface, acquires positional information about each point, and creates course data of a course passing through areas to be determined on the basis of installation positions of the installation objects in the order of installation. The system installs installation objects as buoys, creates a guide image to be used to indicate a buoy to be passed next and a direction from the buoy to be passed next to a buoy to be passed further next by using the course data while intending the guide image for a user of a boat configured to travel along the course on the water surface, and displays the created guide image on a display unit arranged on a hull of the boat.

16 Claims, 6 Drawing Sheets

(56) References Cited

U.S. PATENT DOCUMENTS

| | | | |
|---|---|---|---|
| 2021/0156692 A1* | 5/2021 | Moriwaki | G01C 21/203 |
| 2021/0269128 A1* | 9/2021 | Rivers | B63B 49/00 |
| 2021/0389765 A1* | 12/2021 | Behrendt | G06F 3/04815 |
| 2021/0396525 A1* | 12/2021 | Hara | G01C 21/203 |
| 2022/0001970 A1* | 1/2022 | Hara | B63H 25/42 |
| 2022/0169353 A1* | 6/2022 | Ikegaya | B63B 79/10 |
| 2022/0194544 A1* | 6/2022 | Ikegaya | B63H 25/42 |
| 2023/0059445 A1* | 2/2023 | Lammers-Meis | B63B 21/38 |
| 2023/0186774 A1* | 6/2023 | Ando | G08G 3/02 |
| | | | 340/984 |
| 2023/0195118 A1* | 6/2023 | Singh | B63B 79/15 |
| | | | 701/21 |
| 2023/0245570 A1* | 8/2023 | Kuroi | G08G 3/00 |
| | | | 701/428 |
| 2023/0264788 A1* | 8/2023 | Inoue | B63B 17/00 |
| | | | 701/21 |
| 2023/0406461 A1* | 12/2023 | Uoshita | B63B 49/00 |
| 2024/0202655 A1* | 6/2024 | Jordi Ballester | |
| | | | G06Q 10/08355 |
| 2024/0271943 A1* | 8/2024 | Johnson | G01C 21/20 |
| 2024/0361763 A1* | 10/2024 | Afman | G05D 1/81 |
| 2025/0020471 A1* | 1/2025 | Vincent | G01S 15/96 |

FOREIGN PATENT DOCUMENTS

| | | | | |
|---|---|---|---|---|
| JP | 2020139928 A | * | 9/2020 | |
| JP | 2021146778 A | * | 9/2021 | |
| KR | 20170117994 A | * | 10/2017 | |
| KR | 20220006322 A | * | 1/2022 | |
| WO | WO-2020045602 A1 | * | 3/2020 | |
| WO | WO-2021049221 A1 | * | 3/2021 | B63B 49/00 |
| WO | WO-2021055646 A1 | * | 3/2021 | G01C 21/005 |
| WO | WO-2021062339 A1 | * | 4/2021 | B63B 1/125 |

\* cited by examiner

200 Course data

| Buoy number | GPS data | | Coordinate data | |
|---|---|---|---|---|
| | Latitude | Longitude | X-coordinate | Y-coordinate |
| 1 | $LAT_1$ | $LNG_1$ | $X_1(0)$ | $Y_1(0)$ |
| 2 | $LAT_2$ | $LNG_2$ | $X_2$ | $Y_2$ |
| 3 | $LAT_3$ | $LNG_3$ | $X_3$ | $Y_3$ |
| 4 | $LAT_4$ | $LNG_4$ | $X_4$ | $Y_4$ |
| 5 | $LAT_5$ | $LNG_5$ | $X_5$ | $Y_5$ |
| 6 | $LAT_6$ | $LNG_6$ | $X_6$ | $Y_6$ | a1, a2, a3

F I G. 3

SYSTEM, BOAT, AND ELECTRONIC DEVICE

CROSS-REFERENCE TO RELATED APPLICATIONS

This application is based upon and claims the benefit of priority from prior Japanese Patent Application No. 2022-014238, filed Feb. 1, 2022, the entire contents of which are incorporated herein by reference.

BACKGROUND OF THE INVENTION

1. Field of the Invention

The present invention relates to a system capable of giving support in easily creating/reproducing, for example, a loop course for small boats on the water surface to thereby enjoy a time race.

2. Description of the Related Art

In recent years, with the growth of popularity of outdoor events, a small boat called a wet bike or the like begins to spread now. As one of ways of enjoying based on the small boat of this kind, a time race in which, for example, comrades compete against one another in the running time of the loop course is conceivable.

Creating a loop course by installing, for example, buoys on the surface of the sea water requires buoys capable of acquiring fixation without being drifted even on the surface of the sea having a depth of a certain degree, and hence creating a loop course is an extremely high hurdle for private leisure.

Further, even in the case where a loop course can be created by installing such buoys, it is difficult to accurately reproduce the course at a later date and moreover, each time the equivalent labor is spent. In the case where a course created on the sea of a certain place is to be reproduced on the sea of another place, it becomes even more difficult to create the course.

Thus, one embodiment of the present invention aims to provide a system capable of giving support in easily creating/reproducing, for example, a loop course for small boats on the water surface to thereby enjoy a time race.

BRIEF SUMMARY OF THE INVENTION

A system of one embodiment includes: positional information acquiring means; user interface means; and control means configured to accept a first operation to be carried out to virtually install installation objects on a water surface by using the user interface means, acquire positional information about a point at which the first operation has been carried out by using the positional information acquiring means, and create course data of a course passing through areas to be determined on the basis of installation positions of the installation objects in the order of installation effected by the first operation by using the positional information.

The installation objects are buoys indicating a starting point and relay points or a goal point, and the control means is further configured to create a guide image to be used to indicate a buoy to be passed next and a direction from the buoy to be passed next to a buoy to be passed further next by using the course data while intending the guide image for a user of a boat configured to travel along the course on the water surface, and display the created guide image on display means arranged on a hull of the boat.

According to a system of one embodiment, it is possible to provide such a way of enjoyment that a virtual course requiring no installation of actual buoys is easily created/reproduced on the water surface, whereby it is possible to readily carry out a time race of circling the virtual course by means of, for example, a small boat.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a view showing an example of course data to be used in the support system of the embodiment.

DETAILED DESCRIPTION OF THE INVENTION

Hereinafter, an embodiment of the present invention will be described with reference to the accompanying drawings.

Figure 1:
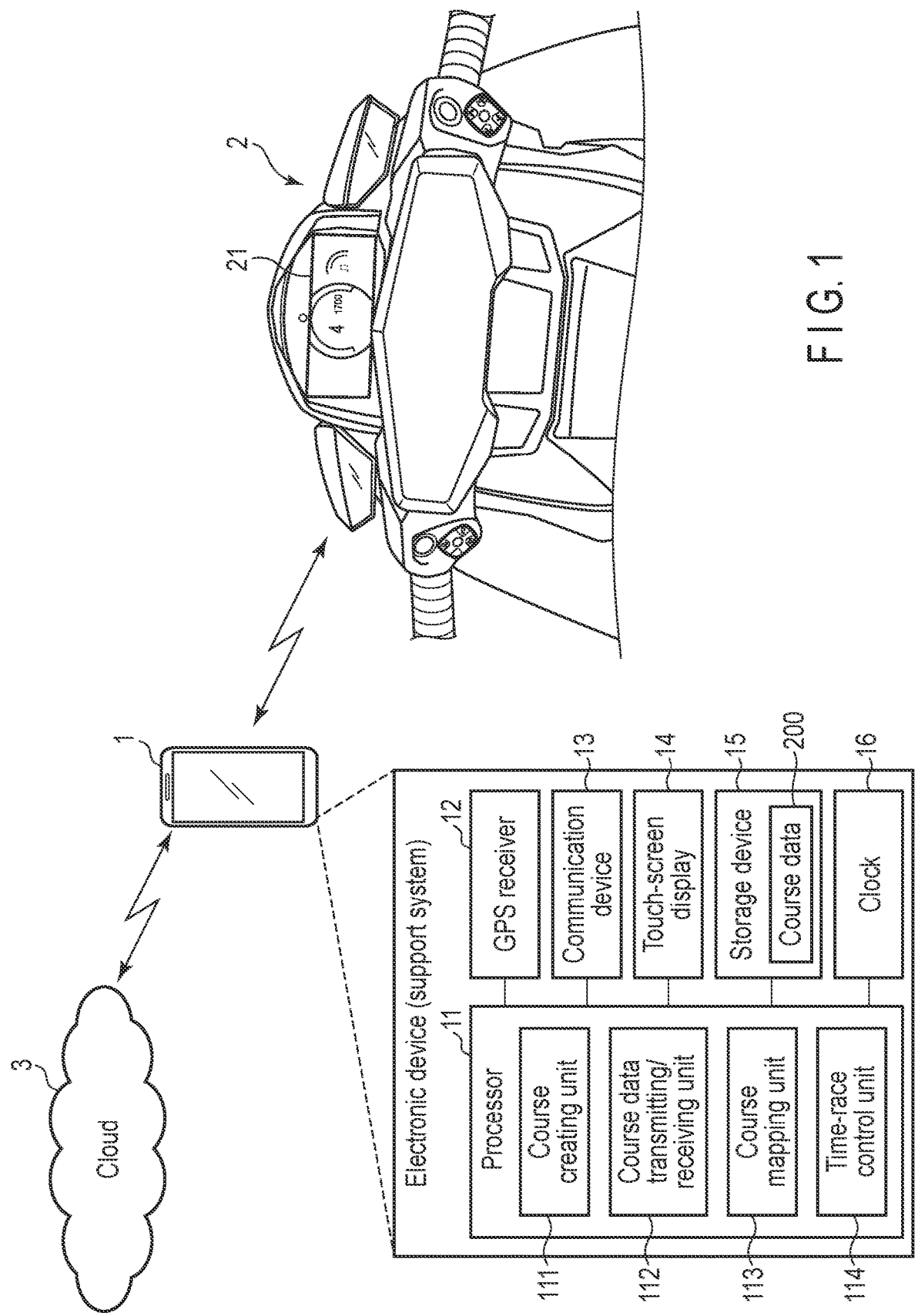
FIG. 1 is a view showing an example of a configuration of a support system of an embodiment.

FIG. 1 is a view showing an example of a configuration of a support system of this embodiment. The support system operates on an electronic device 1 such as a smartphone or the like and provides a user of a small boat 2 called a wet bike or the like with such a way of enjoyment that a virtual course requiring no installation of actual buoys is easily created/reproduced on the water surface, whereby it is possible to readily carry out a time race of circling the virtual course. Here, although it is assumed that the support system operates on the electronic device 1, the function thereof may also be incorporated in the small boat 2 itself. Alternatively, the support system may also be realized on the basis of such a situation that a part of the function thereof is incorporated in the electronic device 1, the remaining part of the function is incorporated in the small boat 2, and the electronic device 1 and small boat cooperate with each other. Furthermore, a part of the function of the support system may also be provided on the cloud 3.

The electronic device 1 is connectable to a liquid crystal display 21 arranged on the hull of the small boat 2 by wireless or by wire, and a guide image to be described later can be displayed on the liquid crystal display 21 described above. It should be noted that the display to be used for displaying the guide image may also be one to be externally arranged on the hull of the small boat 2 as a display for the support system separately from the aforementioned liquid crystal display 21 for displaying various meters. Alternatively, the electronic device 1 itself may externally be arranged on the hull of the small boat 2, and a touch-screen display 14 of the electronic device 1 may be used as a display for displaying the guide image.

Further, the electronic device 1 is connectable to the cloud (server on the Internet) 3 by wireless, and is capable of downloading the course data to be described later from the cloud 3 and uploading the data to the cloud 3. Furthermore, the electronic device 1 is connectable to another electronic device 1 by wireless or by wire, and is capable of transmitting/receiving the course data to/from an electronic device (support system) 1 of another user.

It should be noted that in the case where the function of the support system is incorporated in the small boat 2, the small boat 2 transmits/receives the course data to/from another small boat 2, and transmits/receives the course data to/from the cloud 3. Alternatively, in this case, the small boat 2 may carry out acceptance/delivery of the course data through a storage medium such as a USB (universal serial bus) memory or the like. Further, in the case where the support system is realized by the cooperation between the electronic device 1 and small boat 2, it is desirable that the function of transmitting/receiving data be borne by the electronic device 1.

As shown in FIG. 1, the electronic device 1 includes a processor 11, a global positioning system (GPS) receiver 12, a communication device 13, a touch-screen display 14, a storage device 15, and a clock 16.

The processor 11 is a device configured to control each component in the electronic device 1 in order to control the operations of the electronic device 1 in an integrated manner. The processor 11 can realize various processing units by executing programs. For example, by downloading an application program for the support system from the cloud 3, installing the downloaded program in the storage device 15, and starting the installed program (causing the processor 11 to execute the installed program), it is possible to realize the various processing units of the support system on the electronic device 1. In the various processing units of the support system, a course creating unit 111, a course data transmitting/receiving unit 112, a course mapping unit 113, and a time-race control unit 114 are included. These processing units will be described later. It should be noted that the various processing units of the support system are not limited to those to be realized by software (programs), and may be realized by hardware such as electronic circuits or the like.

The GPS receiver 12 receives a signal sent from an artificial satellite and acquires positional information such as latitude, longitude, altitude, and the like by measurement. It should be noted that without limitation to the GPS, whatever system capable of obtaining positional information at sea can be applied in place of the GPS.

The communication device 13 executes communication for displaying a guide image on the liquid crystal display 21 of the small boat 2, communication for downloading course data from the cloud 3, communication for transmitting/receiving course data to/from another electronic device 1, and the like. Although in FIG. 1, only one communication device 13 is shown for the sake of simplification, actually the electronic device 1 includes a plurality of communication devices 13 for each of the communication standards.

The touch-screen display 14 is a device to be used for the graphical user interface (GUI). The touch-screen display 14 displays thereon an image to be specified by the processor 11 according to a request from the processor 11, further detects a touch operation on the display screen (displayed image) to be carried out by the user, and notifies the processor 11 of the positional information about the touch operation. The various processing units to be realized by the processor 11 by executing the programs can carry out data output (presentation) to the user through the touch-screen display 14, and can accept data input from the user by displaying an image on which manual operation buttons and input field are arranged on the touch-screen display 14.

The storage device 15 is a non-volatile memory such as a flash memory. In the storage device 15, various application programs including an application program for the support system are installed and, in addition, data items of various application programs are stored. In these data items, the course data to be described later is included. It should be noted that although in FIG. 1, only one storage device 15 is shown for the sake of simplification, the electronic device 1 further includes a volatile memory such as a dynamic random access memory [RAM] (DRAM) as a work area of the processor 11.

The clock 16 is a device capable of clocking the actual time as a real time clock (RTC) and further capable of clocking the elapsed time as a stopwatch. Furthermore, the clock 16 can also carry out a countdown of the specified time length as a timer.

Subsequently, the various processing units of the support system will be described below.

Figure 2:
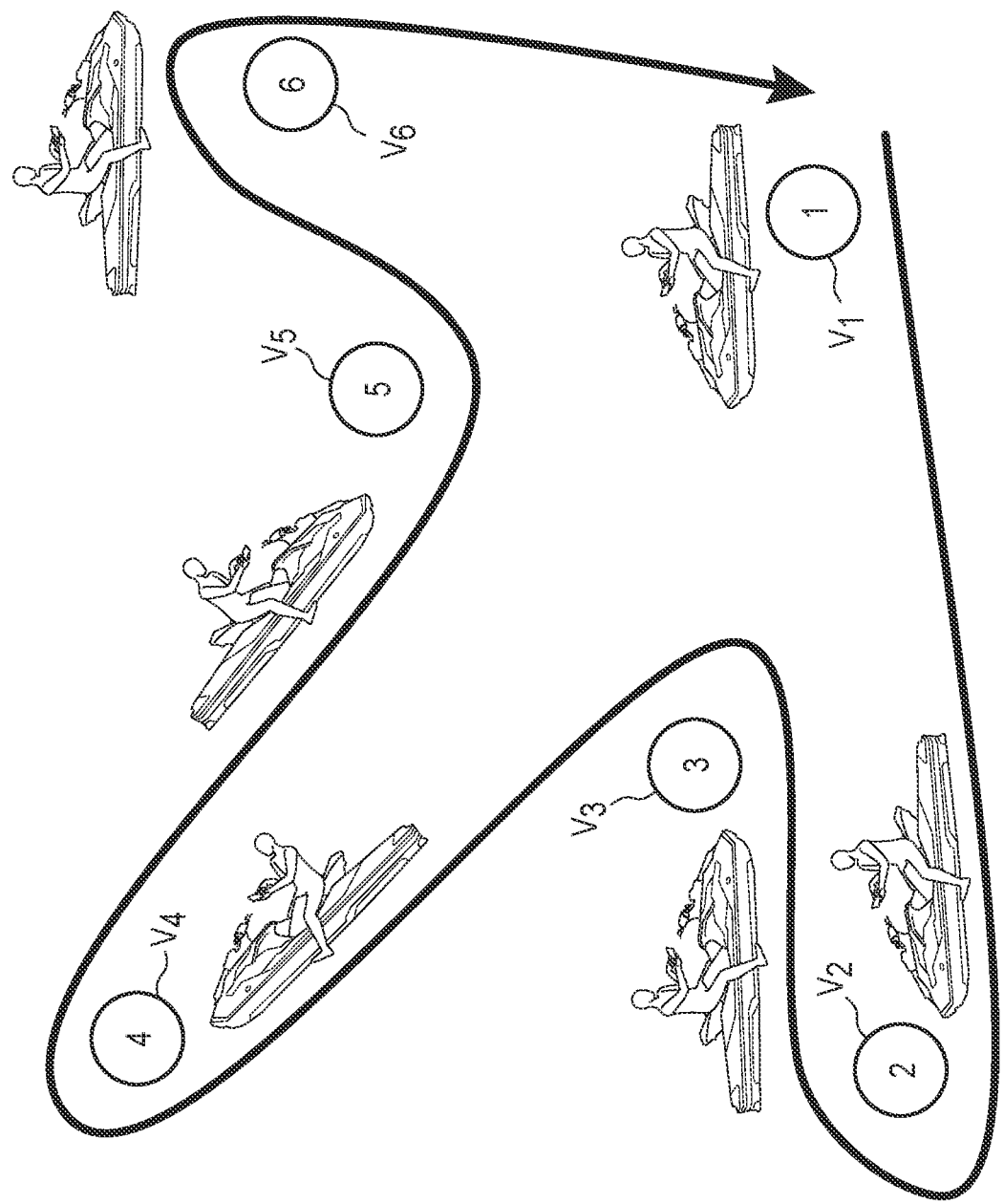
FIG. 2 is view for explaining the mechanism (workings) of creating a course in the support system of the embodiment.

The course creating unit 111 is a module configured to enable the user to easily create a course along which the user navigates the small boat 2. In other words, the course creating unit 111 is a module to be used by the user to create course data 200 by himself or by herself. With reference to FIG. 2, the mechanism (workings) by which the course creating unit 111 creates a course will be described below.

The user navigates along the water surface of the sea, lake or the like by use of the small boat 2 while carrying the electronic device with him or her and, first moves to a point which the user wishes to make the starting post. Here, a use case where the user intends to enjoy a time race based on the small boat 2 on the sea of a certain place is assumed. The course creating unit 111 displays an image on which for example, a manual operation button configured to instruct to start creating the course, a manual operation button configured to instruct to install buoys, a manual operation button configured to instruct to terminate creation of the course, and the like are arranged on the touch-screen display 14. By a touch operation on the image, the user starts creating the course and installs the first buoy. Here, it is assumed that the first buoy is installed at the point $V_1$. Here, installing a buoy does not imply installing an actual buoy but implies designating the current position as an installation position of the buoy.

It should be noted that the user may also carry out in advance an operation of instructing to start creating the course before moving to the point $V_1$. Further, the operation of instructing to install a buoy at the point $V_1$ is an operation of installing the first buoy, and hence the course creating unit 111 may automatically interpret the point as the starting point or the user may explicitly carry out an operation of indicating that the aforementioned point is the starting point.

Here, creation of a loop course is assumed, and it is assumed that the starting point is also the goal point.

When the operation of instructing to install a buoy is carried out, the course creating unit 111 acquires positional information from the GPS receiver 12. The course data 200 has a data structure of, for example, a table form and, when the first buoy is installed, the course creating unit 111 stores the positional information in the first entry of the course data 200. At this time, the course creating unit 111 stores values indicating the coordinate origin in the aforementioned entry.

Next, the user moves to the point $V_2$ which the user intends to make the first corner after starting and carries out again an operation of instructing to install a buoy in order to install the second buoy. Upon receipt of this operation, the course creating unit 111 acquires positional information from the GPS receiver 12 and, this time, stores the positional information in the second entry of the course data 200. At this time, the course creating unit 111 uses, for example, the positional information about the first buoy and positional information about the second buoy to thereby calculate coordinates indicating a position relative to the first buoy and store the calculated coordinates in the aforementioned entry.

Thereafter, in the same way, the user moves in the manner indicated by the arrows from the point $V_3$ to point $V_4$ then to point $V_5$ and then to point $V_6$ to thereby carry out an operation of instructing to install a buoy at each of the points. Each time this operation is carried out, the course creating unit 111 acquires positional information from the GPS receiver 12 and stores the acquired positional information items in sequence while incrementing the entry number of the course data 200. Further, the course creating unit 111 uses, for example, the positional information about the first buoy and positional information items of the other buoys to thereby calculate the coordinates indicating positions relative to the first buoy and stores the calculated coordinates in the entries. Upon completion of installation of a buoy at the point $V_6$, the user carries out an operation of instructing to terminate the creation of the course. It should be noted that the course creating unit 111 may collectively carry out calculation of the coordinates concerning the buoys at the time of receipt of the instruction.

As previously described, here, creation of a loop course is assumed, and a course on which the last buoy (point $V_6$) and first buoy (point $V_1$) are connected to each other is completed. This course is a virtual course along which the buoys are virtually installed on the sea surface. The course creating unit 111 may accept input of the course name from the user through the touch-screen display 14. The course creating unit 111 stores the course data 200 of the completed course in the storage device 15. The course creating unit 111 may also display the layout of the course on the touch-screen display 14 to thereby urge the user to confirm the layout before storing the course data 200 in the storage device 15.

It should be noted that although when the function of the support system is incorporated in the small boat 2, the means for moving from one point to another is limited to the small boat 2 described above and, when the aforementioned function is not incorporated in the small boat 2, the user may not necessarily use the small boat 2 as the means for moving from one point to another (while carrying the electronic device 1 with the user).

In FIG. 3, an example of the course data 200 to be created by the course creating unit 111 is shown.

It is possible that a plurality of course data items 200 having course names input by the user at the time and date of creation or at the time of creation as identifiers exists on the storage device 15. As shown in FIG. 3, the course data 200 includes a buoy number field a1, a GPS data field a2, and a coordinate data field a3.

The buoy number field a1 is a field configured to store therein numbers indicating the order of the buoys. The buoy having the number of the minimum value (1 in this case) is the buoy which is the starting point and is also the goal point. In FIG. 3, the course data 200 of the course shown in FIG. 2 is exemplified and the maximum value of the buoy number is 6. That is, the entry number of the course data 200 is 6. However, the entry number of the course data 200 can change for each course.

The GPS data field a2 is a field configured to store therein positional information acquired from the GPS receiver 12 at the time of installation of each buoy. In the GPS data field a2, for example, the latitude ($LAT_N$) and longitude ($LNG_N$) are stored.

The coordinate data field a3 is a field configured to store therein coordinates of each buoy in the case where the starting point is made the origin. In the coordinate data field a3, for example, the X-coordinate ($X_N$) and Y-coordinate ($Y_N$) in which the east-and-west direction is made the X-axis, and north-and-south direction is made the Y-axis are stored.

Returning to FIG. 1, descriptions of the various processing units of the support system will be continued.

The course data transmitting/receiving unit 112 is a module configured to enable a plurality of users to transmit/receive course data 200 to/from the rest of the plurality of users. The course data transmitting/receiving unit 112 displays an image on which for example, a manual operation button configured to connect with the communications partner, a manual operation button configured to instruct to transmit the course data 200, a manual operation button configured to instruct to receive the course data 200, and the like are arranged on the touch-screen display 14. When for example, an operation of instructing to transmit the course data 200 is carried out, the course data transmitting/receiving unit 112 displays a list of the course data items 200 stored in the storage device 15 on the touch-screen display 14, reads the course data 200 selected from the list from the storage device 15, and transmits the selected course data 200 to the communications partner through the communication device 13. When an operation of instructing to receive the course data 200 is carried out, the course data transmitting/receiving unit 112 stands by for reception of the course data 200 to be carried out by the communication device 13, and stores the received course data 200 in the storage device 15.

Further, the course data transmitting/receiving unit 112 can also download the course data 200 from the cloud 3. As the typical case of the download, acquisition of the layout of the famous race can be cited. In this case too, the course data transmitting/receiving unit 112 downloads the desired course data 200 through the communication device 13, and stores the downloaded course data 200 in the storage device 15. Furthermore, the course data transmitting/receiving unit 112 can also upload the course data 200 to the cloud 3 through the communication device 13. That is, transmission/reception of the course data 200 between users through the cloud 3 is also enabled.

The course mapping unit 113 is a module configured to reproduce a course created on the sea of a certain place on the sea of another place. As described previously with reference to FIG. 3, the course data 200 includes the coordinate field a3. The course mapping unit 113 uses the coordinates of the coordinate field a3 (and positional information to be acquired from the GPS receiver 12) to thereby calculate the latitude and longitude of the GPS data field a2. The course mapping unit 113 displays an image on which for example, a manual operation button configured to select the course data 200, a manual operation button configured to set the starting point, and the like are arranged on the touch-screen display 14.

The user moves to a position which the user intends to make the starting point by use of the small boat 2, selects the course data 200 of the course which the user intends to reproduce, and carries out an operation of making the aforementioned position the starting point. At this time, the user also carries out an operation of specifying the direction of the first corner, i.e., direction of the buoy $V_2$. Upon receipt of this operation, the course mapping unit 113 reads the selected course data 200 from the storage device 15, and calculates the latitude and longitude of each buoy on the basis of the values of the coordinate data field a3 and positional information to be acquired from the GPS receiver 12. The course mapping unit 113 stores the latitude and longitude included in the positional information to be acquired from the GPS receiver 12 as they are in the GPS data field a2 of the entry of the buoy $V_1$. In the coordinate field a3 of the entry of each of the buoys subsequent to the buoy $V_2$, coordinates in which the buoy $V_1$ is made the origin are stored, and hence the course mapping unit 113 calculates the latitude and longitude of the GPS data field a2 of each entry on the basis of this origin and direction of the buoy $V_2$ to be simultaneously specified at the time of setting the starting point. The course mapping unit 113 creates course data 200 in which the original course data 200 is kept as it is, and GPS data field a2 is updated, and temporarily stores the created course data 200 in the storage device 15. It should be noted that the course mapping unit 113 may also permanently store the newly created course data 200 described above in the storage device 15 according to, for example, an instruction from the user.

Alternatively, the course mapping unit 113 may accept an instruction, after the user moves to the position of the buoy $V_2$ by means of the small boat 2, to newly make a position the position of the buoy $V_2$ in place of simultaneously receiving the designation of the direction of the buoy $V_2$ at the time of setting the starting point. In this case, it becomes also possible to reproduce the layout of, for example, the course downloaded from the cloud 3 or course created in the past in an enlarged form or in a reduced form on the basis of the ratio between the designated distance from the buoy $V_1$ to the buoy $V_2$ and distance from the buoy $V_1$ to the buoy $V_2$ on the course data 200.

It should be noted that reproduction of the course to be carried out by the course mapping unit 113 is not limited to reproduction of a course created on the sea of another place. For example, even in the case of a course created on the sea of the same place where the entire course has to be slightly shifted, it is possible to cope with such a situation by course reproduction to be carried out by the course mapping unit 113. Alternatively, it is possible to reproduce a course created on the sea on the lake or on the contrary, it is also possible to reproduce a course created on the lake on the sea.

Further, it is also possible for the course mapping unit 113 to move or delete an arbitrary buoy on the course. Furthermore, it is also possible for the course mapping unit 113 to add a buoy or buoys. Regarding, for example, movement of the buoy, the user gives an instruction to select a target buoy from the plurality of buoys at the point to which the user wants to move the buoy, and move the buoy to the current position. Upon receipt of this instruction, the course mapping unit 113 uses the positional information acquired from the GPS receiver 12 to thereby update the GPS data field a2 of the entry corresponding to the selected buoy. Regarding deletion of the buoy, it sufficient if the user issues an instruction to select the target buoy from the plurality of buoys irrespective of the place and delete the selected buoy. Upon receipt of this instruction, the course mapping unit 113 deletes the entry corresponding to the selected buoy. At this time, the course mapping unit 113 carries out renumbering (subtraction of 1) with respect to the buoy number field a1 of each of the entries subsequent to the aforementioned entry.

Regarding addition of a buoy or buoys, the user carries out an instruction to select one or both of two buoys (to be positioned immediately antecedent to and immediately subsequent to the buoy to be added) from, for example, the plurality of buoys, and add buoys at positions immediately antecedent to and immediately subsequent to the aforementioned buoy or add a buoy between the aforementioned two buoys. Upon receipt of this instruction, the course mapping unit 113 inserts an entry or entries corresponding to the buoy or buoys to be added, and stores the positional information acquired from the GPS receiver 12 in the GPS data field a2 of the aforementioned entry or each of the aforementioned entries. Further, at this time, the course mapping unit 113 carries out renumbering (addition of 1) with respect to the buoy number field a1 of each of the entries subsequent to the entry described above. Thereby, the user can carry out an arbitrary change at the time of reproduction of the course in order to increase or decrease, for example, the difficulty. The course mapping unit 113 may update the original course data 200 or may newly create course data 200 in which the original course data 200 is kept as it is, and which has been subjected to movement, deletion, and addition of the buoy. The newly created course data 200 described above may temporarily be stored in the storage device 15 or may permanently be stored therein. The function of movement, deletion, and addition of the buoy may also be installed in the course creating unit 111 and, movement, deletion, and addition of the buoy may also be carried out as adjustment at the time of creation of the course.

Figure 4:
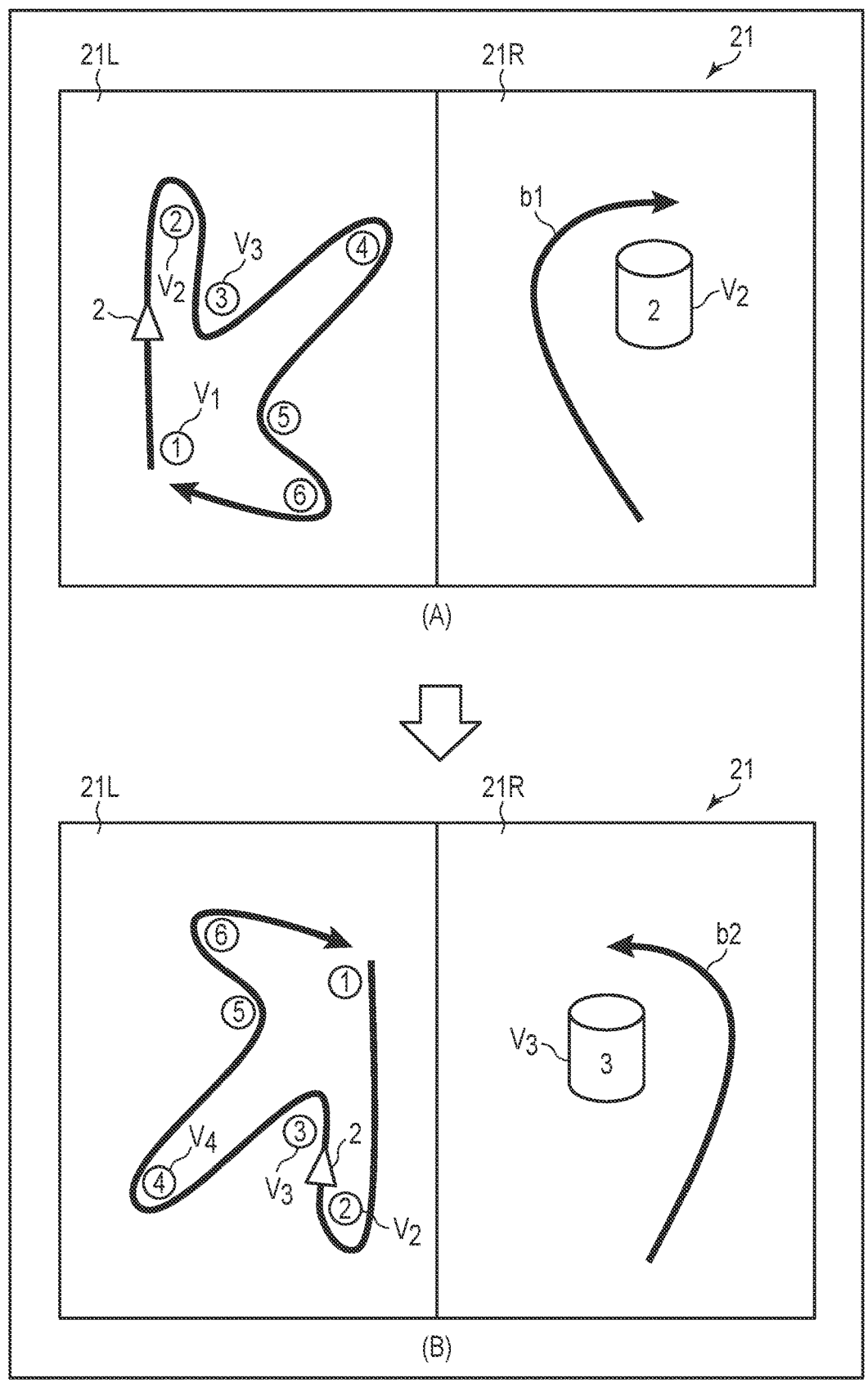
FIG. 4 is a view showing an example of guide image to be displayed in the support system of the embodiment.

The time-race control unit 114 is a module configured to be used by the user to enjoy a time race on the course created or reproduced in accordance with, for example, the aforementioned procedure. As previously described, in the course data 200, various information items about arrangement of buoys are recorded. The time-race control unit 114 uses the course data 200 to thereby display a guide image to be used by the user to enjoy a time race with a feeling as if the buoys are installed without installing actual buoys on the sea. With reference to FIG. 4, the guide image to be displayed by the time-race control unit 114 will be described below.

The time-race control unit 114 displays an image on which for example, a manual operation button configured to select the objective course data 200 from a plurality of course data items 200 stored in the storage device 15, a manual operation button configured to set the number of laps, a manual operation button configured to instruct to start a race, and the like are arranged on the touch-screen display 14. Here, the course data 200 which can be a choice may be course data 200 created by the course creating unit 111 just before, may be course data 200 acquired by the course data transmitting/receiving unit 112 from another user or may be course data 200 obtained by subjecting the existing course data 200 to update of the GPS data field a2 thereof by the course mapping unit 113. After carrying out issuance of instructions concerning selection of the course data 200, setting of the number of laps, starting of a race, and the like, the user may store the electronic device 1 in, for example, a storage box or the like provided on the hull of the small boat 2 in order to prevent the electronic device 1 from getting wet with sea water.

When the course data 200 is selected and an instruction to start the race is issued, the time-race control unit 114 instructs the communication device 13 to connect with the liquid crystal display 21 of the small boat 2. The electronic device 1 and liquid crystal display 21 of the small boat 2 may be connected with each other by wireless conforming to for example, the IEEE 802.11g standard or may be connected with each other by wire by, for example, a USB cable. When connection with the liquid crystal display 21 of the small boat 2 is established, the time-race control unit 114 displays an image configured to guide the small boat 2 of the user to the starting point on the liquid crystal display 21 of the small boat 2 on the basis of the latitude and longitude of the positional information to be acquired from the GPS receiver 12 and latitude and longitude stored in the GPS data field a2 of the course data 200. This image is an image indicating for example, the layout of the entire course and position of the small boat 2.

Upon detection of an entry of the small boat 2 into the predetermined geographical range including the starting point from the latitude and longitude of the positional information to be acquired from the GPS receiver 12, the time-race control unit 114 determines that the small boat has reached the starting point. The aforementioned predetermined geographical range is determined on the basis of for example, the accuracy of the positional information to be acquired from the GPS receiver 12. When the small boat 2 reaches the starting point, the time-race control unit 114 displays an image indicating, in addition to the layout of the entire course and position of the small boat 2, the next buoy and direction from the next buoy to a further next buoy on the liquid crystal display 21 of the small boat 2.

Upon detection of an exit of the small boat 2 from the predetermined geographical range including the starting point after the arrival thereof at the starting point, the time-race control unit 114 determines that the user has started from the starting point. After carrying out this determination, the time-race control unit 114 activates the stopwatch function of the clock 16. It should be noted that the user may start from the starting point in the state where the small boat 2 is stopped or may make a start by navigating the small boat from the direction of a position opposed to, for example, the buoy $V_2$ and causing the small boat to pass through the starting point of the buoy $V_1$ (entering the predetermined geographical range and exiting from the predetermined geographical range). Regarding the ways of starting, it is sufficient if an agreement is made among the users. The time-race control unit 114 may display the fact that the time race has been started or may display the time or the like being clocked by the clock 16 on the liquid crystal display 21 of the small boat 2.

FIG. 4(A) shows an example of a guide image to be displayed by the time-race control unit 114 on the liquid crystal display 21 of the small boat 2 in the state where the user is, after starting in the time-race from the point of the buoy $V_1$ which is the starting point, on the way to the buoy $V_2$ which is the next corner.

As shown in FIG. 4(A), the time-race control unit 114 displays a guide image constituted of two images, e.g., a left image 21L and right image 21R on the liquid crystal display 21 of the small boat 2. The time-race control unit 114 displays, on the left image 21L, the layout of the entire course and position of the small boat 2 and, on the other hand, displays, on the right image 21R, the next buoy $V_2$ and direction (b1) from the aforementioned next buoy $V_2$ to the further next buoy $V_3$. The aforementioned image for guiding the small boat 2 of the user to the starting point may also be this left image 21L. The time-race control unit 114 displays the left image 21L in such a manner that for example, the traveling direction of the small boat 2 points to the certain fixed direction (upward direction in this case). Alternatively, the time-race control unit 114 may display the left image 21L in such a manner that a certain fixed direction (for example, upward direction) of the guide image is made a fixed direction (for example, northerly direction) according to the operation of the user to be carried out concomitantly with the race starting instruction.

The time-race control unit 114 can carry out display of the direction (b1) of the right image 21R by using three positional information items about the buoys $V_1$ to $V_3$, more specifically, by using the values of the GPS data field a2 of the course data 200 or coordinate data field a3 thereof. Alternatively, at the time of creation of the course, the course creating unit 111 may create data indicating the direction to the next buoy and store the data in the course data 200 in advance and, the time-race control unit 114 may carry out display of the direction (b1) of the right image 21R on the basis of this data.

In parallel with displaying of the layout of the entire course and position of the small boat on the left image 21L, the time-race control unit 114 displays the next buoy $V_2$ and direction (b1) from the aforementioned next buoy $V_2$ to the further next buoy $V_3$ on the right image 21R, and hence it is possible to offer to the user a sense of realism that makes the user feel as if actual buoys are installed. Further, by displaying the direction (b1) to the further next buoy $V_3$, it is possible for the time-race control unit 114 to visually indicate how to pass (turn at) the buoy $V_2$. It should be noted that the time-race control unit 114 may also calculate the distance between the position of the small boat 2 and next buoy $V_2$ from the latitude and longitude of the positional information to be acquired from the GPS receiver 12 and control the display size of the buoy $V_2$ according to the calculated distance. More specifically, the time-race control unit 114 may control the display size in such a manner that as the small boat 2 comes nearer to the buoy $V_2$, the display size thereof becomes gradually larger.

The time-race control unit 114 determines whether or not the small boat 2 of the user has passed the buoy $V_2$ on the basis of the latitude and longitude of the positional information to be acquired from the GPS receiver 12 and latitude and longitude stored in the GPS data field a2 of the entry corresponding to the buoy $V_2$ of the course data 200. When the small boat 2 of the user enters the predetermined geographical range including the point of the buoy $V_2$, the time-race control unit 114 determines that the small boat 2 of the user has passed the buoy $V_2$. Upon execution of this determination, the time-race control unit 114 switches the right image 21R of the guide image as shown in FIG. 4(B).

The time-race control unit 114 may univocally define the predetermined geographical range for determining whether or not the small boat 2 has passed the buoy as a circular range around the installation point of the buoy or may adaptively define the geographical range in such a manner that, for example, the area side opposed to the direction in which the small boat 2 should make a turn is widely covered on the basis of, for example, the installation point of the buoy and direction and direction in which the small boat 2 should make a turn.

As shown in FIG. 4(B), on the right image 21R of the guide image after switching, the buoy $V_3$ is displayed as the next buoy and, direction (b2) from the aforementioned next buoy $V_3$ to the further next buoy $V_4$ is also displayed. It should be noted that with respect to the left image 21L of the guide image, the time-race control unit 114 makes an update as the need arises concomitantly with the movement of the small boat 2.

Thereafter, in a similar way, each time the small boat 2 of the user passes the buoy along the way from the buoy $V_3$ to buoy $V_4$ to buoy $V_5$ and to buoy $V_6$, the time-race control unit 114 switches the right image 21R of the guide image to another. The time-race control unit 114 counts the number of laps while assuming, for example, the initial value to be 1 and, while the number of counts is less than the number of laps specified by the user, when the small boat 2 passes the buoy (buoy $V_6$ in this case) having the maximum value of the buoy numbers in the course data 200, the time-race control unit 114 displays the right image 21R of the guide image on which the buoy of the starting point is made the next buoy, and updates the image to an image displaying the direction from the buoy of the starting point to the buoy of the first corner. In the state where the number of counts reaches the aforementioned number of laps, when the small boat 2 passes the buoy of the maximum value of the buoy numbers, the time-race control unit 114 displays the right image 21R of the guide image in such a manner that the buoy of the starting point is shown as the next buoy while indicating that the next buoy is the goal.

The time-race control unit 114 may further display the current number of laps or may display the number of remaining laps. When the current number of laps is to be displayed, the time-race control unit 114 may simultaneously display the specified number of laps ("current number of laps/specified number of laps" or the like).

When the small boat 2 passes the buoy of the goal point, the time-race control unit 114 stops the stopwatch function of the clock 16 and displays the fact that the time race has been ended, traveling time clocked by the clock 16, and the like on the guide image.

As described above, in the support system of this embodiment, it is possible for the user to readily create/reproduce a virtual course requiring no installation of actual buoys, and it is also possible for the support system to give support in easily enjoying a time race using the aforementioned virtual course. Reproduction of the virtual course is not limited to the course created in the past on the sea of the same place, and the virtual course may be a course created in the past on the sea of another place or may be a course or the like of a famous race downloaded from the cloud 3. Furthermore, regarding reproduction of the virtual course, it is possible not only to carry out reproduction of the course with a high degree of fidelity but also to make various modifications such as displacement, deletion, and addition of buoys, enlargement/reduction of the entire course, and the like to the course.

Figure 5:
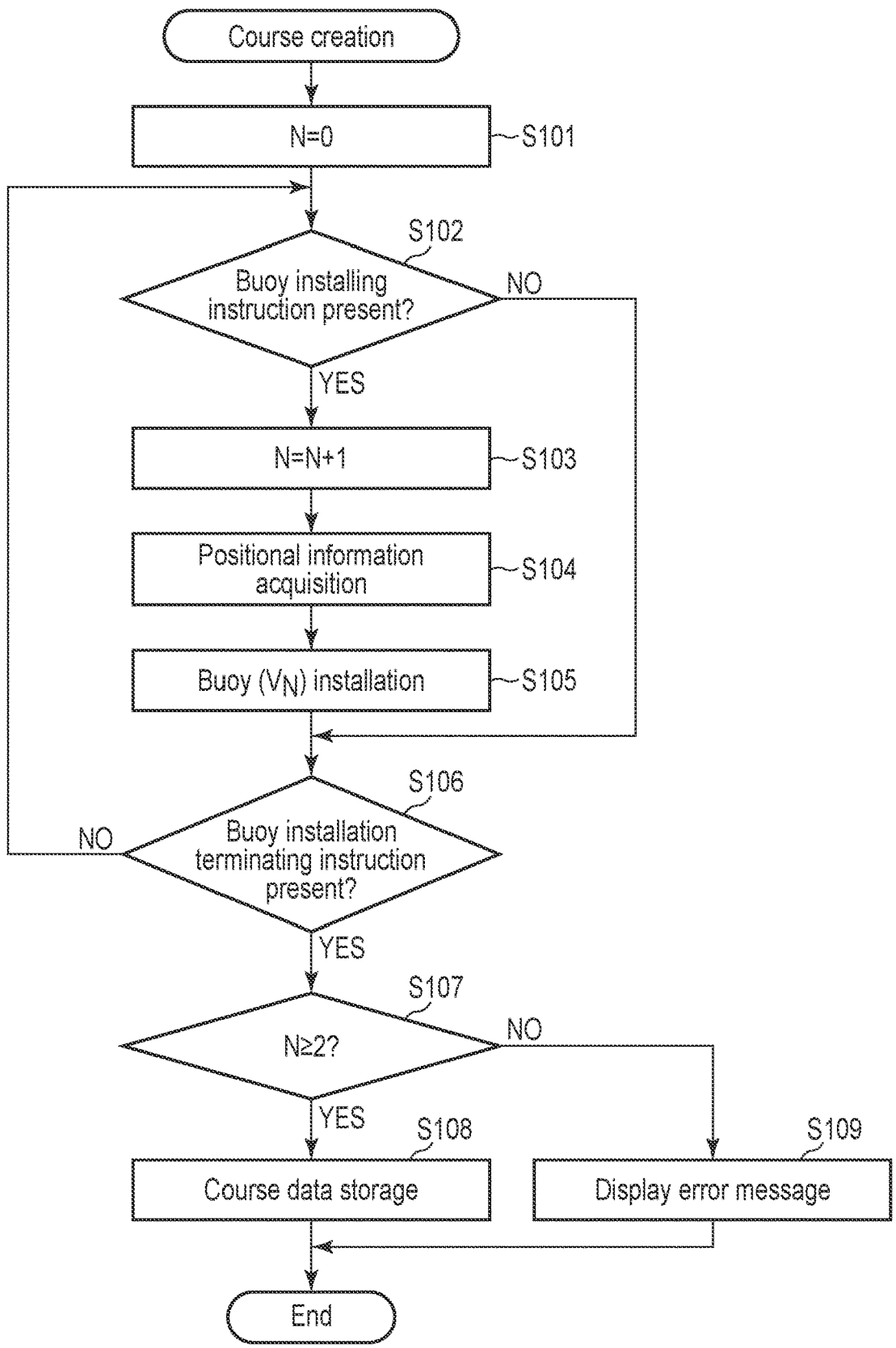
FIG. 5 is a flowchart showing an example of a procedure for creating a course in the support system of the embodiment.

FIG. 5 is a flowchart showing an example of a procedure for creating a course in the support system of this embodiment.

The course creating unit 111 initializes the counter N configured to identify the buoy number to 0 (S101). The course creating unit 111 determines whether or not a buoy installing instruction is present (S102). Upon receipt of a buoy installing instruction (S102: YES), the course creating unit 111 increments the counter (S103), and acquires positional information from the GPS receiver 12 (S104). The course creating unit 111 uses the acquired positional information to thereby install an N-th buoy $V_N$ in a virtual manner (S105). When the buoy installing instruction is absent (S102: NO), the course creating unit 111 skips steps S103 to S105.

Next, the course creating unit 111 determines whether or not a buoy installation terminating instruction is present (S106). Upon receipt of a buoy installation terminating instruction (S106: YES), the course creating unit 111 determines whether or not the value of the counter N is greater than or equal to 2 (S107). When the value of the counter N is greater than or equal to 2 (S107: YES), the course creating unit 111 stores the course data 200 of the course on which the N buoys are installed in the storage device 15 (S108), and terminates the processing. When the value of the counter N is less than 2 (S107: NO), the course creating unit 111 displays an error message warning that the value of the counter N has not yet reached the number of buoys necessary for the loop course (S109), and terminates the processing without carrying out a storing operation of the course data 200.

Figure 6:
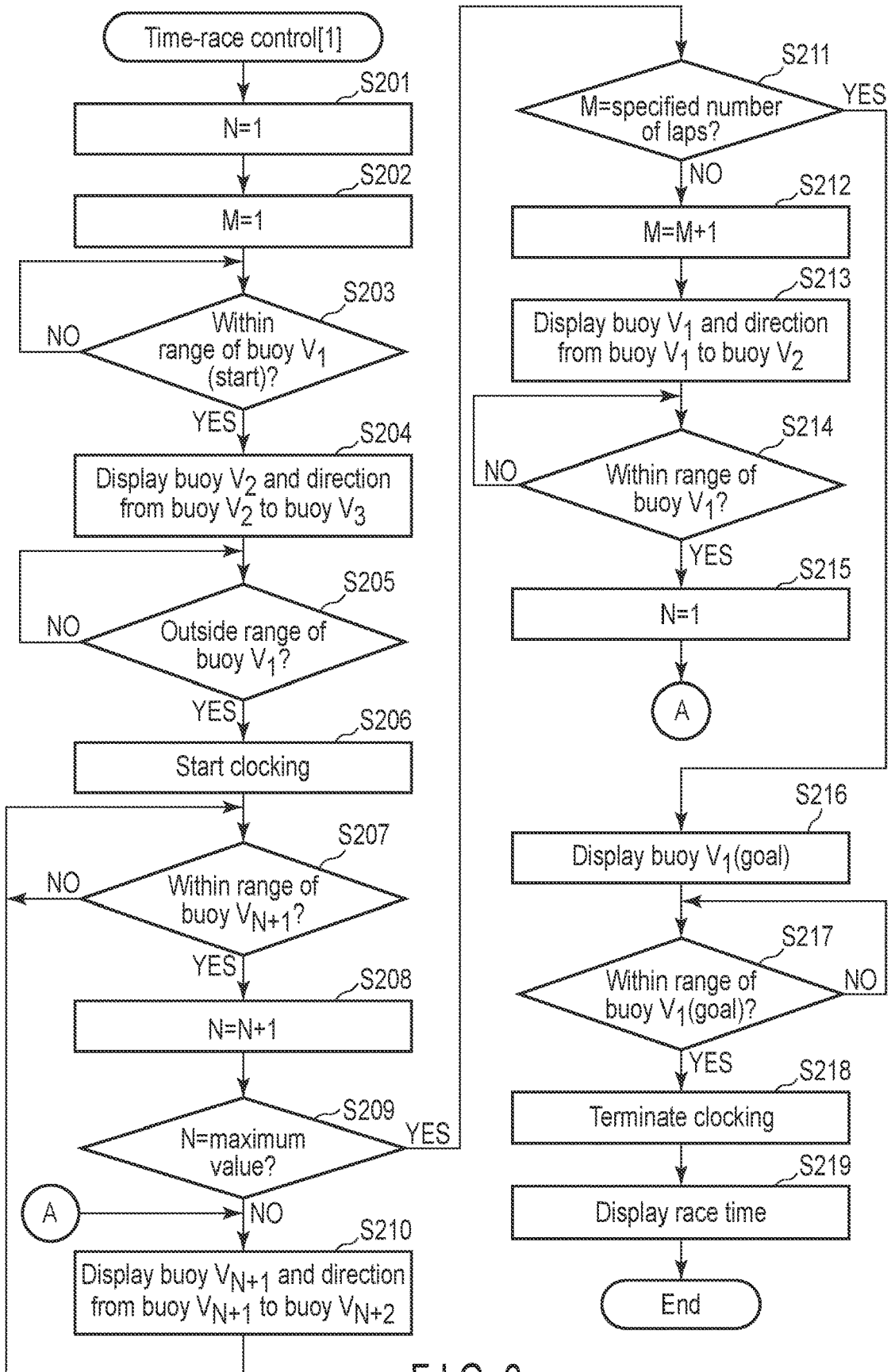
FIG. 6 is a flowchart showing an example of a procedure for time-race control in the support system of the embodiment.

FIG. 6 is a flowchart showing an example of a procedure for time-race control in the support system of this embodiment. It should be noted that it is assumed here that reproduction of the course including selection of the course data 200, specification of the number of laps, and race-starting instruction are separately carried out for the sake of easy comprehension of the descriptions.

The time-race control unit 114 initializes the counter N configured to identify the buoy number to 1 (S201). Further, the time-race control unit 114 initializes the counter M configured to count the number of laps to 1 (S202). Then, the time-race control unit 114 uses the positional information to be acquired from the GPS receiver 12 and values of the GPS data field a2 of the course data 200 to thereby determine whether or not the small boat 2 of the user is present within the range of the buoy $V_1$ (or whether or not the small boat 2 of the user has entered the range of the buoy $V_1$) (S203). Hereinafter, regarding the determinations whether or not the small boat 2 of the user is present within the range of the buoy, and whether or not the small boat 2 of the user has exited to the outside of the range of the buoy, these determinations are carried out by using the positional information to be acquired from the GPS receiver 12 and values of the GPS data field a2 of the course data 200 as in the case of S203, and hence descriptions of these determinations are omitted.

When the small boat 2 is not present within the range of the buoy $V_1$ (S203: NO), the time-race control unit 114 stands by for the entry of the small boat 2 of the user into the range of buoy $V_1$. When the small boat 2 is present within the range of the buoy $V_1$ (S203: YES), the time-race control unit 114 displays the buoy $V_2$ and direction from the buoy $V_2$ to the buoy $V_3$ on the liquid crystal display 21 of the small boat (S204). The time-race control unit 114 determines whether or not the small boat 2 of the user has exited to the outside of the range of the buoy $V_1$ (S205). When the small boat 2 has exited to the outside of the range of the buoy $V_1$ (S205: YES), the time-race control unit 114 starts clocking to be carried by the clock 16 (S206).

Next, the time-race control unit 114 determines whether or not the small boat 2 of the user has entered the range of the buoy $V_{N+1}$ (S207). When the small boat 2 has not yet entered the range of the buoy $V_{N+1}$ (S207: NO), the time-race control unit 114 stands by for the entry of the small boat 2 of the user into the range of the buoy $V_{N+1}$. When the small boat 2 has entered the range of the buoy $V_{N+1}$ (S207: YES), the time-race control unit 114 increments the counter N (S208), and determines whether or not the value of the counter N is the maximum value (of the buoy number field a1 of the course data 200) (S209). When the value has not yet reached the maximum value (S209: NO), the time-race control unit 114 displays the buoy $V_{N+1}$ and direction from the buoy $V_{N+1}$ to the buoy $V_{N+2}$ on the liquid crystal display 21 of the small boat 2 (S210), moves to S207, and stands by for the entry of the small boat 2 of the user into the range of the buoy $V_{N+1}$.

On the other hand, when the value of the counter N has already reached the maximum value (S209: YES), the time-race control unit 114 determines this time whether or not the value of the counter M has reached the number of laps specified by the user (S211). When the value has not yet reached the specified number of laps (S211: NO), the time-race control unit 114 increments the counter M (S212). Further, the time-race control unit 114 displays the buoy $V_1$ and direction from the buoy $V_1$ to the buoy $V_2$ on the liquid crystal display 21 of the small boat 2 (S213). The time-race control unit 114 determines whether or not the small boat 2 of the user has entered the range of the buoy $V_1$ (S214) and, when the small boat 2 has not yet entered the range of the buoy $V_1$ (S214: NO), stands by for the entry of the small boat 2 of the user into the range of the buoy $V_1$.

When the small boat 2 of the user has entered the range of the buoy $V_1$ (S214: YES), the time-race control unit 114 initializes the counter N to 1 (S215). The time-race control unit 114 moves to S210 and displays the buoy $V_{N+1}$ and direction from the buoy $V_{N+1}$ to the buoy $V_{N+2}$ on the liquid crystal display 21 of the small boat 2. The time-race control unit 114 moves to S207 and stands by for the entry of the small boat 2 of the user into the range of the buoy $V_{N+1}$.

When the value of the counter M has already reached the specified number of laps (S211: YES), the time-race control unit 114 displays the buoy $V_1$ as the goal (S216). The time-race control unit 114 determines whether or not the small boat 2 of the user has entered the range of the buoy $V_1$ (S217) and, when the small boat has not yet entered the range of the buoy $V_1$ yet (S217: NO), stands by for the entry of the small boat 2 of the user into the range of the buoy $V_1$. When the small boat 2 has entered the range of the buoy $V_1$ (S217: YES), the time-race control unit 114 terminates the clocking to be carried out by the clock 16 (S218), displays the race time clocked by the aforementioned clock 16 on the liquid crystal display 21 of the small boat 2 (S219), and then terminates the processing.

As described above, according to the support system of this embodiment, it is possible to provide such a way of enjoyment that a virtual course requiring no provision of actual buoys is easily created/reproduced on the water surface, whereby it is possible to readily carry out a time race of circling the virtual course by means of, for example, a small boat.

It should be noted that in the above descriptions, an example in which the user moves along the water surface by means of a small boat 2 while carrying the electronic device 1 equipped with the GPS receiver 12 with him or her and, carries out operations for installing buoys at points at which the user wants to install buoys has been described. In place of the above configuration, the support system may also be configured in such a manner that an operation for installing a buoy is accepted at an arbitrary point on the water surface with the use of map data. More specifically, a map is displayed on the touch-screen display 14, and course data 200 in which positional information items about points at which touch operations on the map have been carried out are held in the operational order may be created.

Further, although in the above descriptions, an example in which a virtual course configured to carry out a time race is created by virtually installing buoys on the water surface has been described, the support system of this embodiment can also be applied to creation or the like of a training course on which installation objects that are obstacles are virtually installed as obstacles to be avoided by other ships and vessels. In this case, the support system may indicate the installation objects on the guide image as if other ships and vessels move within ranges to be determined on the basis of the installation positions.

That is, the embodiment described above is an example and, in implementing the present invention, it is possible to implement the invention by variously modifying the elements constituting the support system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system comprising:
a boat on which a display unit is arranged; and
an electronic device communicably connected to the boat, wherein:
the electronic device includes:
a positional information acquiring unit;
a user interface unit; and
a control unit,
the control unit is configured to:
accept a first operation carried out by a user of the boat to virtually install installation objects on a water surface by using the user interface unit,
acquire positional information on earth about each point with respect to which the first operation has been carried out by using the positional information acquiring unit, and
create course data of a course passing through areas determined based on installation positions of the installation objects, in an order in which the installation objects were accepted by the first operation, by using the positional information, and
the display unit is configured to display a guide image based on the installation positions of the installation objects.

2. The system of claim 1, wherein:
the installation objects include a plurality of buoys indicating a starting point and at least one of relay points and a goal point;
the control unit is further configured to create the guide image to be used to indicate a buoy to be passed next and a direction from the buoy to be passed next to a buoy to be passed further next by using the course data while intending the guide image for a user of a boat configured to travel along the course on the water surfac, and control the display unit to display the created guide image; and
the display unit is arranged on a hull of the boat.

3. The system of claim 2, wherein the control unit is further configured to, when the boat has entered a predetermined geographical range defined based on a point at which a buoy to be passed next is installed, determine that the boat has passed the buoy to be passed next, and update the guide image.

4. The system of claim 2, wherein the control unit is further configured to display an overall view of the course on the display unit.

5. The system of claim 2, wherein the control unit is further configured to:
accept a second operation carried out by the user to move a specified installation objects from among the installation objects on the course by using the user interface unit;
acquire positional information on earth about a point with respect to which the second operation has been carried out by using the positional information acquiring unit; and
update the course data by using the positional information to move the specified installation object.

6. The system of claim 2, wherein the control unit is further configured to:
accept a third operation carried out by the user to delete a specified installation object from among the installation objects on the course by using the user interface unit; and
update the course data in order to delete the specified installation object and to make an installation object immediately antecedent to the specified installation object before deletion and an installation object immediately subsequent to the specified installation object before deletion adjacent to each other.

7. The system of claim 2, wherein the electronic device further comprises a first communication unit configured to transmit/receive the course data to/from an electronic device of another user.

8. The system of claim 2, wherein the control unit is further configured to:
convert positional information of the course data into coordinates; and
virtually install the installation objects on a water surface different from the water surface with respect to which the first operation has been carried out by using the coordinates.

9. The system of claim 8, wherein the control unit is further configured to virtually install the installation objects in such a manner as to reduce or enlarge a size of the course by using the coordinates.

10. The system of claim 8, wherein:
the electronic device further comprises a second communication unit configured to acquire the course data from a server on the Internet, and
the control unit is further configured to virtually install the installation objects of the course indicated by the course data on an arbitrary water surface by using the course data acquired by the second communication unit.

11. The system of claim 2, wherein:
the electronic device further comprises a clocking unit, and
the control unit is further configured to:
accept a fourth operation carried out by the user to set a number of laps of the course by using the user interface unit; and
clock a traveling time of a boat traveling along the course on a water surface a number of times corresponding to the set number of laps by using the clocking unit.

12. The system of claim 1, wherein the control unit is further configured to create the guide image, on which the installation objects are virtually indicated as obstacles to be avoided while the user travels along the course on the water surface, and to control the display unit to display the guide image.

13. The system of claim 12, wherein the control unit is further configured to create the guide image such that each of the installation objects moves within a range determined based on its installation position.

14. The system of claim 1, wherein the control unit is further configured to:
accept the first operation multiple times;
acquire the positional information on a plurality of points with respect to each of which the first operation has been carried out; and
create the course data by using the positional information acquired with respect to the plurality of points.

15. A boat comprising:
a positional information acquiring unit;
a user interface unit;
a control unit; and
a display unit,
wherein:
the control unit is configured to:
accept a first operation carried out by a user of the boat to virtually install installation objects on a water surface by using the user interface unit,
acquire positional information on earth about each point with respect to which the first operation has been carried out by using the positional information acquiring unit, and
create course data of a course passing through areas determined based on installation positions of the installation objects, in an order in which the installation objects were accepted by the first operation, by using the positional information, and
the display unit is configured to display a guide image based on the installation positions of the installation objects.

16. An electronic device configured to be provided on a boat, the electronic device comprising:
a positional information acquiring unit;
a user interface unit;
a control unit; and
a display unit,
wherein:
the control unit is configured to:
accept a first operation carried out by a user of the boat to virtually install installation objects on a water surface by using the user interface unit,
acquire positional information on earth about each point with respect to which the first operation has been carried out by using the positional information acquiring unit, and
create course data of a course passing through areas determined based on installation positions of the installation objects, in an order in which the installation objects were accepted by the first operation, by using the positional information, and
the display unit is configured to display a guide image based on the installation positions of the installation objects.

* * * * *